United States Patent
Aga et al.

(10) Patent No.: US 7,288,241 B2
(45) Date of Patent: Oct. 30, 2007

(54) BLACK COMPOSITE OXIDE PARTICLE AND METHOD FOR PRODUCTION THEREOF

(75) Inventors: Koji Aga, Okayama (JP); Hiroyuki Shimamura, Tokyo (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 169 days.

(21) Appl. No.: 10/498,485

(22) PCT Filed: Dec. 12, 2002

(86) PCT No.: PCT/JP02/13030

§ 371 (c)(1),
(2), (4) Date: Mar. 9, 2005

(87) PCT Pub. No.: WO03/053853

PCT Pub. Date: Jul. 3, 2003

(65) Prior Publication Data

US 2005/0152828 A1    Jul. 14, 2005

(30) Foreign Application Priority Data

Dec. 12, 2001   (JP)   ............................. 2001-379134

(51) Int. Cl.
*B05D 5/00* (2006.01)
*C01G 49/00* (2006.01)

(52) U.S. Cl. .............. 423/594.1; 423/600; 423/594.16; 423/138; 423/140; 423/141; 423/155; 423/158; 423/159; 423/111; 423/115; 423/122; 423/123; 427/212; 427/215; 427/219

(58) Field of Classification Search ............. 423/593.1, 423/594.1, 600, 594.16, 138, 140, 141, 155, 423/158, 159, 111, 115, 122, 123; 427/212, 427/215, 219

See application file for complete search history.

(56) References Cited

U.S. PATENT DOCUMENTS 4,082,905 A * 4/1978 Stephan et al. .......... 428/842.6
5,354,637 A * 10/1994 Shimamura et al. ...... 430/106.2

FOREIGN PATENT DOCUMENTS

| JP | 48-69789  | 9/1973 |
|----|-----------|--------|
| JP | 57-057755 | 4/1982 |
| JP | 58-123548 | 7/1983 |
| JP | 9-124972  | 5/1997 |
| JP | 9-237570  | 9/1997 |

* cited by examiner

Primary Examiner—Timothy C. Vanoy
(74) Attorney, Agent, or Firm—Young & Thompson

(57) ABSTRACT

A black composite oxide particle includes a composite oxide having Fe, Mg and Al as metal components. The particle contains Fe, Mg and Al in amounts of 30 to 55 mass %, 1 to 10 mass %, and 1 to 10 mass %, respectively, and has an atomic ratio of $Fe^{3+}/Fe^{2+}$ of 0.8 to 10. Also described is a method for producing the black composite oxide particle. In an embodiment, the particle includes a hydrated composite oxide represented by an empirical formula: $Fe^{2+}_a Fe^{3+}_b Mg_c Al_d O_e \cdot nH_2O$. The black composite oxide particle is suitable as a black pigment for a coating material, an ink, toner particles, a rubber and a plastic, and is reduced with respect to the load on the environment and excellent in blackness.

20 Claims, 1 Drawing Sheet

US 7,288,241 B2

BLACK COMPOSITE OXIDE PARTICLE AND METHOD FOR PRODUCTION THEREOF

TECHNICAL FIELD

Figure 1:
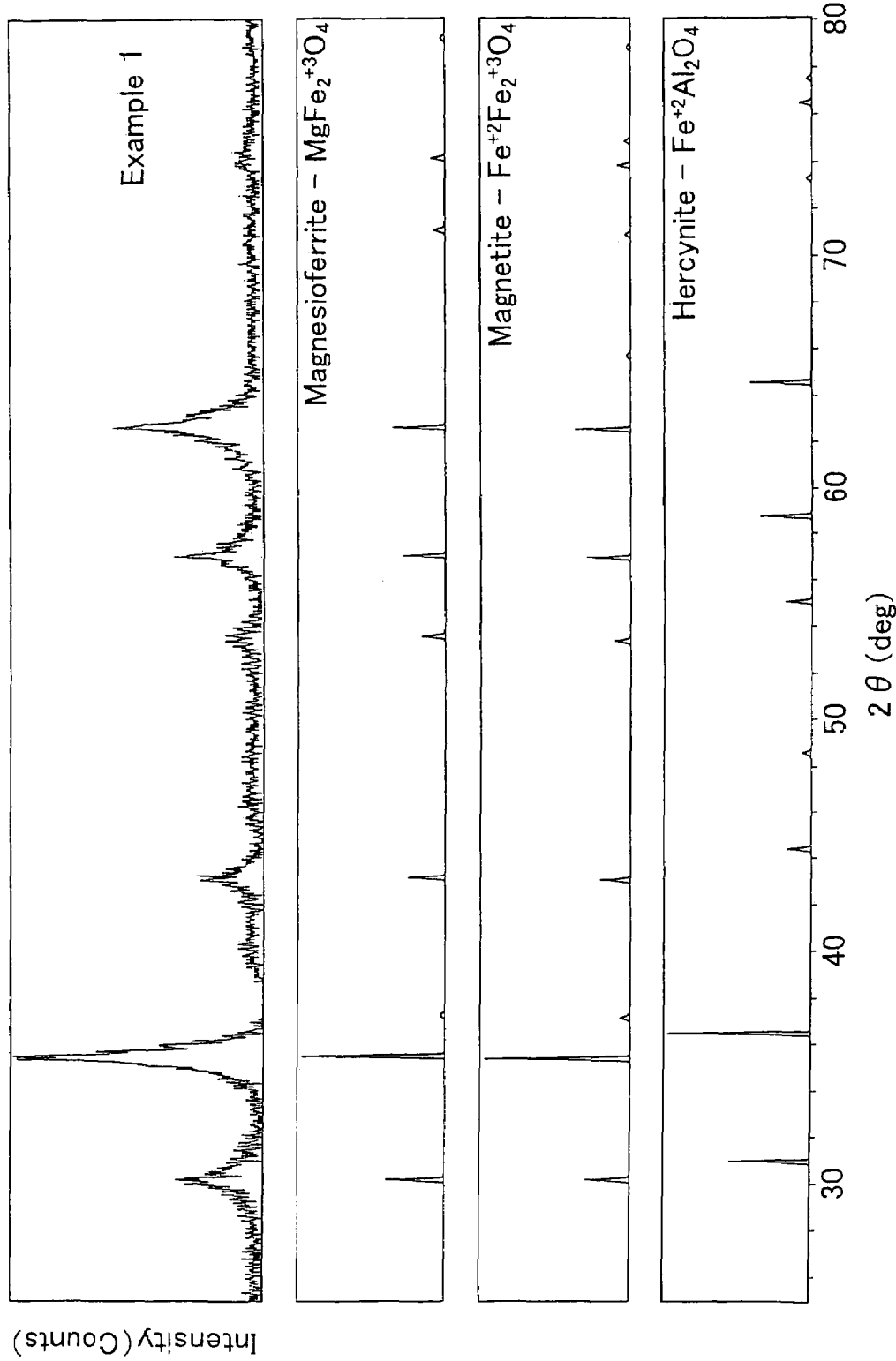

The present invention relates to black complex oxide particles and a method for the preparation of the particles and more particularly to black complex oxide particles, which comprise a complex oxide containing a specific metal component in a specific amount and which are excellent in the degree of blackness as well as a method for the preparation of such particles. The black complex oxide particles are favorably and mainly used as black pigments for paints and varnishes, ink, toner particles and rubber and plastic materials and they are favorably used, in particular, in non-magnetic toner particles as a substitute for carbon black and the coloration of engineering plastics requiring a high temperature kneading operation.

BACKGROUND ART

It has been demanded that black pigments used in, for instance, paints and varnishes, ink, toner particles and-the coloration of rubber and plastic materials should be excellent in a variety of characteristic properties such as the degree of blackness, color hue, staining power and hiding power and that they must not be expensive. For this reason, there have conventionally been used, for instance, carbon black, iron oxide-containing paints represented by magnetite and other complex oxide pigments, depending on respective applications.

In all of the foregoing technical fields, there have recently been desired for the development of a technique for providing a pigment, which can not only satisfy the requirements of high-quality and high-performance, but also solve problems of, for instance, the environmental pollution and any adverse effect on the human body in case of, for instance, the foregoing carbon black and accordingly, the use thereof has been restrained. On the other hand, the iron oxide-containing pigments represented by magnetite do not suffer from the foregoing problems to such an extent-that carbon black suffers from the same, but the degree of blackness thereof is greatly dependent on the bonding conditions of $Fe^{2+}$ ions present therein (or the quality of FeO). Moreover, these pigments suffer from such a problem that these $Fe^{2+}$ ions (or FeO) are oxidized into $Fe^{3+}$ ions. (or $Fe_2O_3$) or the pigments would undergo deterioration with the elapse of time.

As a technique relating to black pigments, which can eliminate the foregoing problems, the use of complex oxide-containing pigments comprising a variety of metal components have attracted special interest recently and there have been proposed complex oxide-containing black pigments each comprising, as principal metal components, at least two members selected from the group consisting of, for instance, copper, chromium, iron and manganese (see, for instance, Japanese Un-Examined Patent Publications Hei 9-124972 and Hei 9-237570).

However, the foregoing technique, which makes use of the complex oxide-containing pigments, is one using, as principal metal components, specific chemical substances specified as substances, which apply loads to the environment, such as copper, chromium and manganese (environmentally load-applying substances), as a result of the recent enactment of the municipal law concerning the Pollutant Release and Transfer Regiter.

Nevertheless, it is quite difficult to obtain an excellent black pigment, which can satisfy the requirement for the degree of blackness as one of the important characteristic properties of the black pigment while reducing the content of the foregoing environmentally load-applying substances to a level as low as possible and there has not yet presently been developed any satisfactory black pigment.

Accordingly, it is an object of the present invention to provide black complex oxide particles suitably and mainly used as a black pigment for paints and varnishes, ink, toner particles, and rubber and plastic materials, having a low load applied to the environment and an excellent degree of blackness as well as a method for the preparation of such black complex oxide particles.

DISCLOSURE OF INVENTION

The inventors of this invention have conducted various studies to obtain materials for a complex oxide-containing black pigment excellent in the degree of blackness while searching for raw materials having a low load applied to the environment, have found out black complex oxide particles, which comprise a specific complex oxide containing, as metal components, specific amounts of Fe, Mg and Al in a specific ratio and have thus completed the present invention.

Accordingly, the black complex oxide particles according to the present invention comprise Fe, Mg and Al as metal components, wherein the amount of Fe ranges from 30 to 55% by mass, the ratio of $Fe^{3+}$ atoms to $Fe^{2+}$ atoms ($Fe^{3+}$/$Fe^{2+}$) ranges from 0.8 to 10, the amount of Mg ranges from 1 to 10% by mass and the amount of Al ranges from 1 to 10% by mass.

In addition, the method for the preparation of black complex oxide particles according to the present invention comprises the steps of gradually adding a mixed aqueous solution containing a ferric salt, a ferrous salt, a water-soluble magnesium salt and a water-soluble aluminum salt to an alkaline aqueous solution containing sodium carbonate, while maintaining the temperature of the alkaline aqueous solution to not less than 80° C. and the pH value thereof to not less than 10 and mixing these solutions with stirring over not less than one hour.

BRIEF DESCRIPTION OF THE INVENTION

FIG. 1 is an X-ray diffraction pattern observed for the black complex oxide particles prepared in Example 1.

BEST MODE FOR CARRYING OUT THE INVENTION

The complex oxide constituting the black complex oxide particles of the present invention comprises Fe, Mg and Al as metal components.

As previously stated in the section entitled "Background Art", the iron oxide-containing pigments represented by magnetite ($Fe_3O_4$) do not suffer from the foregoing problems to such an extent that carbon black suffers from the same, but the degree of blackness thereof is greatly dependent on the bonding conditions of $Fe^{2+}$ ions present therein (or the quality of FeO). Moreover, these pigments suffer from such a problem that these $Fe^{2+}$ ions (or FeO) are oxidized into $Fe^{3+}$ ions (or $Fe_2O_3$) or the pigments suffer from such a problem that they undergo deterioration with the elapse of time.

On the other hand, with respect to Mg used as a metal component for the complex oxide in the present invention, the color of the oxide thereof, in itself, is not black, but it has been known that when the magnesium oxide is compounded with iron oxide, the resulting complex, for instance, magnesium ferrite ($MgFe_2O_4$) is colored yellowish brown.

Moreover, regarding Al used as a metal component of the complex oxide in the present invention, it has been known that when it is compounded with iron oxide, hercynite ($FeAl_2O_4$) is formed, which comprises coexisting Fe and Al and which is tinged with black.

It would be recognized that, in the complex oxide constituting the black complex oxide particles according to the present invention, the foregoing magnetite, magnesium ferrite and hercynite are not mixed therein separately, but Al is present, in its amorphous state, in the Fe—Mg solid solution type composition having characteristic properties of the spinel structure and if the complex oxide has a specific composition, it can possess the degree of blackness required for the black pigment.

For instance, the results shown in FIG. 1, which is an X-ray diffraction pattern observed for the black complex oxide particles according to the present invention prepared in Example 1 as will be detailed later, clearly indicate that the black complex oxide particles of the present invention are not beyond the scope of the spinel type particles although the peaks observed for the black complex oxide particles are shifted from the main peaks of magnetite, magnesium ferrite and hercynite peculiar thereto and this fact would support the foregoing estimation.

In the complex oxide constituting the black complex oxide particles according to the present invention, it is quite important that the amount of Fe ranges from 30 to 55% by mass, the ratio of $Fe^{3+}$ atoms to $Fe^{2+}$ atoms ($Fe^{3+}/Fe^{2+}$) ranges from 0.8 to 10, the amount of Mg ranges from 1 to 10% by mass and the amount of Al ranges from 1 to 10% by mass.

If the amount of Fe present in the complex oxide is less than 30% by mass, the content of Fe in the complex oxide is too low and therefore the resulting complex oxide is insufficient in the characteristic properties originated from the iron-containing oxide and the degree of blackness of the resulting complex oxide is accordingly liable to be reduced. On the other hand, if the amount of Fe present in the complex oxide exceeds 55% by mass, the resulting complex oxide is very close to the magnetite type complex iron oxide and therefore it may suffer from such a problem that the $Fe^{2+}$ ions (or FeO) present therein are oxidized into Fe ions (or $Fe_2O_3$) or that it undergoes deterioration with the elapse of time, while the degree of blackness thereof is high. Taking into consideration not only the reconciliation of the degree of blackness and stability with time as requirements for the pigment, but also the control of the influence of magnetization in case where the particles are used as toner particles and the impartment of sufficient degree of blackness to printed letters, the amount of Fe present in the complex oxide preferably ranges from 35 to 45% by mass.

In addition, the Fe component in the complex oxide should be present in the form of both $Fe^{2+}$ and $Fe^{3+}$. Taking into consideration the degree of blackness and ease in manufacturing of the black complex oxide particles, the ratio of $Fe^{2+}$ atoms to $Fe^{3+}$ atoms ($Fe^{3+}/Fe^{2+}$) should fall within the range of from 0.8 to 10 and further the amount of $Fe^{2+}$ as expressed in terms of the amount of FeO preferably ranges from 8 to 20% by mass. Essentially, the degree of blackness of the black complex oxide particles according to the present invention is not dependent upon the amount of $Fe^{2+}$, but if the amount of $Fe^{2+}$ as expressed in terms of the amount of FeO is less than 8% by mass, the degree of blackness thereof is necessarily influenced by the amount of $Fe^{2+}$. On the other hand, if the amount of $Fe^{2+}$ as expressed in terms of the amount of FeO exceeds 20% by mass, the resulting complex oxide may suffer from such a problem that the $Fe^{2+}$ ions (or FeO) present therein are oxidized into $Fe^{3+}$ ions (or $Fe_2O_3$) or that it undergoes deterioration with the elapse of time, while the degree of blackness thereof is high.

Moreover, if the amount of Mg present in the complex oxide is less than 1% by mass, the relative amount of Fe correspondingly becomes high, the resulting complex oxide is very close to the magnetite type complex iron oxide and therefore, it may suffer from such a problem that the $Fe^{2+}$ ions (or FeO) present therein are oxidized into $Fe^{3+}$ ions (or $Fe_2O_3$) or that it undergoes deterioration with the elapse of time, while the degree of blackness thereof is high.

Moreover, if the amount of Mg present in the complex oxide exceeds 10% by mass, magnesium ferrite type complex iron oxide is separated out or non-black colored particles other than spinel type ones are precipitated and more specifically, the degree of blackness and hue of the resulting complex oxide may be reduced. Taking into consideration not only the reconciliation of the degree of blackness and stability with time as requirements for the pigment, but also the control of the influence of magnetization in case where the particles are used as toner particles and the impartment of sufficient degree of blackness to printed letters, the amount of Mg present in the complex oxide preferably ranges from 2 to 7% by mass.

Further, if the amount of Al present in the complex oxide is less than 1% by mass, the relative amount of Fe correspondingly becomes high, the resulting complex oxide is very close to the magnetite type complex iron oxide and therefore, it may suffer from such a problem that the $Fe^{2+}$ ions (or FeO) present therein are oxidized into $Fe^{3+}$ ions (or $Fe_2O_3$) or that it undergoes deterioration with the elapse of time, while the degree of blackness thereof is high.

Moreover, if the amount of Al present in the complex oxide exceeds 10% by mass, not only hercynite type complex iron oxide, but also non-black particles mainly comprising Al are separated and more specifically, the degree of blackness and hue of the resulting complex oxide may be reduced. Taking into consideration not only the reconciliation of the degree of blackness and stability with time as requirements for the pigment, but also the control of the influence of magnetization in case where the particles are used as toner particles and the impartment of sufficient degree of blackness to printed letters, the amount of Al present in the complex oxide preferably ranges from 5 to 9% by mass.

In the present invention, it is also intended that the black complex oxide particles are prepared from substances having a low level of the load applied to the environment and in this respect, the complex oxide particles may comprise, for instance, Si, Ti and/or Ca, but they preferably comprise a complex oxide containing Fe, Mg and Al while attaching importance to the degree of blackness of the resulting complex oxide particles.

Moreover, regarding the complex oxide constituting the black complex oxide particles according to the present invention, the presence of combined water (water of crystallization) and the amount thereof are not considered to be essential requirements for the degree of blackness, such combined water is necessarily incorporated into the final product in the usual preparation method and it is not necessary to daringly remove the combined water. In the determination of the composition of the complex oxide, the sum of the amounts of Fe, Mg and Al is not equal to 100% by mass even if all of the Fe, Mg and Al are present in the form of oxidized conditions and accordingly, the composition of the complex oxide is expressed in terms of a complex-oxide containing combined water or water-containing complex oxide.

The complex oxide constituting the black complex oxide particles of the present invention is preferably one represented by the following chemical compositional formula:

$$Fe^{2+}{}_a Fe^{3+}{}_b Mg_c Al_d O_e \cdot nH_2O$$

Wherein
a+b+c+d=1;
$0.08 \leq a \leq 0.59$;
$0.13 \leq b \leq 0.80$;
$0.02 \leq c \leq 0.42$;
$0.02 \leq d \leq 0.40$;
e=a+1.5b+c+1.5d; and
$0 \leq n \leq 5.1$.

Moreover, it is more preferred that the complex oxide satisfies the following requirements: $0.05 \leq c/(a+b) \leq 0.5$ and/or $0.15 \leq d/(a+b) \leq 0.6$.

In the complex oxide or water-containing complex oxide represented by the foregoing chemical compositional formula, the reason why the values of a, b, c and d are preferably restricted to the foregoing respective range's and the reason why the values of c/(a+b) and d/(a+b) should more preferably fall within the ranges specified above, respectively are substantially the same as those described above in connection with the limitation of the amounts of Fe, Mg and Al.

In the black complex oxide particles of the present invention, it is preferred to restrict the total amount of the metal components other than Fe, Mg and Al such as Cr, Mn, Co, Ni, Cu and Zn should be limited to the level of not more than 1% by mass. These substances are often included in iron oxide particles as inevitable components present in the raw material therefor from the industrial standpoint, but they may apply high loads to the environment and it is therefore a matter of course that the amount thereof is small.

The black complex oxide particles of the present invention preferably has an average particle size ranging from 0.01 to 1 μm. This is because if the average particle size thereof is less than 0.01 μm, the resulting oxide powder may be tinged with red and may thus be insufficient in the degree of blackness, while if it exceeds 1 μm, the resulting particles are unfavorable for use in fields, which require the use of fine particles, such as the field of toner particles. Moreover, the complex oxide particles preferably have a specific surface area as determined by the BET method on the order of 3 to 150 m²/g.

Regarding the degree of blackness and the hue of powder according to JIS K 5101-1991, the black complex oxide particles of the present invention preferably has an L value of not more than 22, an a value of not more than 0.5 and a b value of not more than 0.5, as determined using a color-difference meter. If these L, a and b values do not satisfy the foregoing requirements, the resulting complex oxide particles have a low degree of blackness, the hue thereof is strongly tinged with red or yellow and the particles are thus unfavorable for use as a black pigment.

Taking into consideration the use or substitution in fields, which do not require any magnetic property, for instance, the use thereof in non-magnetic toner particles as a typical example, the black complex oxide particles of the present invention preferably have a saturation magnetization value as determined at an applied magnetic field of 79.6 kA/m of not more than 50 Am²/kg. This saturation magnetization value is more preferably not more than 40 Am²/kg when it is intended to obtain printed matters of high image quality while inhibiting any effect of a magnetic field on toner particles.

The black complex oxide particles of the present invention preferably have a volume resistivity of not less than $1 \times 10^6$ Ω cm since the use of such complex oxide particles having a higher volume resistivity in toner particles would permit the preparation of printed matters of high quality, which are free of, for instances defects such as fogging, inside omissions, white spots and stripes (brushing marks). This volume resistivity is more preferably not less than $5 \times 10^6$ Ω cm when it is intended to obtain high quality printed matters without any escape of electric charges present on charged toner particles.

In addition, the black complex oxide particles of the present invention is preferably surface-treated with at least one compound selected from the group consisting of silane coupling agents, silylation agents and reactive silicone oils in an amount ranging from 0.5 to 5% by mass on the basis of the mass of the particles. The black complex oxide particles subjected to such a surface treatment acquire water repellency, are improved in the dispersibility in organic solvents and are suitably used, in particular, in the preparation of polymeric toner particles. If the amount of the foregoing surface-treating substance exceeds 5% by mass, the resulting black complex oxide particles undergo cohesion to thus form aggregates and it is not only impossible to make the most use of the effect of the surface-treatment, but also the aggregates rather than the black complex oxide particles may be subjected to such surface treatment. Accordingly, the dispersibility of the resulting complex oxide particles in resins is apt to be reduced. As a result, the resulting toner particles are insufficient in their quality because of their wide distribution of charges. The foregoing surface-treating agent is more preferably applied to the particles in an amount of not more than 4% by mass in order to precisely and steadily control the charges on the toner particles and to obtain toner particles having a sufficient degree of blackness.

With respect to the surface treatment with the foregoing silane coupling agent the foregoing silane coupling agent possesses a high charging-control effect, it has an effect of positively charging the black complex oxide particles, in particular, when an aminosilane coupling agent is used and therefore, it is favorably used in the production of positively charged toner particles.

Regarding the surface treatment with the foregoing silylation agent, the agent has an effect of negatively charging the black complex oxide particles and therefore, it is favorably used in the production of negatively charged toner particles.

The use of the foregoing reactive silicone oil in the surface treatment of the complex oxide particles would be able to improve the mixing properties of the particles in the blending process prior to the melting and kneading process when preparing toner particles.

The shape of the black complex oxide particles according to the present invention is not restricted to any specific one insofar as they are in any particulate shape (such as spherical, hexahedral or octahedral shape).

As has been discussed above in detail, when the black complex oxide particles are used in the production of toner particles, the resulting toner particles are completely free of any substance capable of applying a high load to the environment such as carbon black, Cu, Cr and Mn and since the black complex oxide particles used are excellent in the degree of blackness, the use of the complex oxide particles would sufficiently cope with the elimination of, for instance, environmental pollution and any effect on the human body.

The amount of the black complex oxide particles to be incorporated into such toner particles is preferably not less than 5% by mass for the purpose of the impartment of a sufficient degree of blackness to printed letters.

Moreover, if the black complex oxide particles to be incorporated into such toner particles have a sufficiently high volume resistivity, the charges formed on toner particles would hardly be decreased and problems concerning the fogging of white ground caused due to the scattering of toner particles on the white ground of duplicating paper and the fogging of a light-sensitive material can be eliminated as compared with the results observed when using, for instance, carbon black having a low volume resistivity.

Moreover, the use of the foregoing toner particles in an image-forming device according to the electrophotography system would permit the formation of printed matters of high quality free of, for instance, fogging, inside omissions, white spots and stripes (brushing marks), in the usual development using only the DC development bias, since the black complex oxide particles included in the toner particles have a high volume resistivity.

When it is intended to obtain printed matters of higher quality, the foregoing toner particles are preferably used in the image-forming device in which a development bias comprises an alternating or AC bias superimposed on a DC development bias. In particular, in the reversal development in which negatively charged toner particles are used and which has been the leading mainstream of the development, it is required for the preparation of printed matters having quite high quality and accordingly, there have also been desired for the development of toner particles in which the charging of the toner particles is quickly started, the quantity of electric charges are not easily reduced or they have a quite narrow distribution of electric charges. In this case, however, the use of the toner particles according to the present invention would permit the production of printed matters having high quality comparable to that observed for the development using only the DC bias.

Then the method for the preparation of the black complex oxide particles according to the present invention will hereunder be described in more detail.

The method for the preparation of the black complex oxide particles according to the present invention comprises the steps of gradually adding a mixed aqueous solution containing a ferric salt, a ferrous salt, a water-soluble magnesium salt and a water-soluble aluminum salt to an alkaline aqueous solution containing sodium carbonate, while maintaining the temperature of the alkaline aqueous solution to a level of not less than 80° C. and the pH value thereof to not less than 10 and mixing these solutions with stirring over not less than one hour.

The mixed aqueous solution containing a ferric salt, a ferrous salt, a water-soluble magnesium salt and a water-soluble aluminum salt, used in the preparation method of the present invention may be prepared by the use of, for instance, aqueous solutions prepared by dissolving water-soluble salts or metals or metal oxides in water optionally in the presence of an acid. When preparing such a mixed aqueous solution, it is important to simultaneously use ferrous and ferric salts as iron salt components and therefore, it is preferred to limit the ratio of $Fe^{3+}$ atoms to $Fe^{2+}$ atoms ($Fe^{3+}/Fe^{2+}$) to the range of from 0.01 to 4. This is because if the ratio: $Fe^{3+}/Fe^{2+}$ is less than 0.01, the oxidation reaction for producing the black complex oxide particles of the present invention does not smoothly proceed and therefore, the production efficiency of the method is insufficient. On the other hand, the use of such a ratio higher than 4 is not preferred since liver brown-colored fine particles of maghemite are formed in a large amount when neutralizing with an alkali.

On the other hand, it is also important that the alkaline aqueous solution used in the neutralization and oxidation contains sodium carbonate. The addition of sodium carbonate to the alkaline aqueous solution would permit the inhibition of any abrupt generation of nucleic oxide particles and this in turn leads to the production of black complex oxide particles having an intended appropriate particle size. The alkaline substance used for adjusting the pH value of the alkaline aqueous solution containing sodium carbonate is not restricted to any specific one insofar as it possesses the neutralization action and may be a strong base or a weak base such as sodium hydroxide, potassium hydroxide or aqueous ammonia.

First of all, it is important, in the method of the present invention that the temperature and pH value of the alkaline aqueous solution containing sodium carbonate are maintained at levels of not less than 80° C. and not less than 10, respectively. In this respect, the use of a temperature of not less than 80° C. is required for smoothly proceeding the reaction and the use of a pH value of not less than 10 is required not only for smoothly proceeding the reaction, but also for the inhibition of any re-dissolution of the precipitated black complex oxide particles due to the consumption of the alkali and the reduction of the pH value. In this connection, however, the temperature of the solution is preferably not more than 100° C. in due consideration of the achievement of an effect compensating for the cost. Moreover, the alkaline substance may be used in an amount required for maintaining the pH value of not less than 10, but the amount thereof is preferably not more than 100 g/L in due consideration of the cost.

To the alkaline aqueous solution containing sodium carbonate thus prepared, there is gradually added a mixed aqueous solution containing a ferrous salt, a ferric salt, a water-soluble magnesium salt and a water-soluble aluminum salt likewise previously prepared, followed by a dehydration-condensation reaction, accompanied by neutralization and oxidation, of these components. At this stage, however, it is important that the stirring and mixing operations of these solutions are carried out for a time of hot less than one hour. This dehydration-condensation reaction accompanied by neutralization and oxidation proceeds within a relatively short period of time although the progress of the reaction is dependent on the atomic ratio: $Fe^{3+}/Fe^{2+}$, but the reaction should be stabilized in the conditions free of any segregation of composition. If the stirring and mixing operations are insufficient, it is difficult to obtain black complex oxide particles having a desired degree of blackness and hue.

In this respect, a variety of gases may be blown through the reaction slurry during stirring and mixing in order to improve the effect of the stirring and mixing operations and the improvement of the stirring and mixing effect in turn permits the reduction of the reaction time and the saving of the cost. Examples of such gases usable in the process are air, steam, oxygen gas and a variety of inert gases (such as nitrogen, helium and argon gases), which may properly be selected and used. In particular, the steam may be fed into the slurry at a high pressure (higher than 1 atm) to thus ensure an effect similar to that accomplished through the use of a pressure vessel.

In addition, the reaction slurry obtained after the completion of the foregoing stirring and mixing operation for a time of not less than one hour may further be heat-treated in a pressure vessel at a temperature of not less than 100° C. under a pressure to thus improve the crystallinity and the heat resistance of the resulting black complex oxide particles and therefore, the reaction slurry is preferably treated according to the foregoing procedure.

After cooling the reaction slurry thus prepared and containing black complex oxide particles, it is neutralized with, for instance, a dilute acid to a pH value of not more than 7, followed by water-washing, dehydration and drying according to the usual methods to thus obtain the final black complex oxide particles.

The black complex oxide particles according to the present invention have a low load applied to the environment, are excellent in the degree of blackness and only slightly deteriorated with the elapse of time and therefore, they can favorably be used as a black pigment for paints and varnishes, ink, toner particles and rubber-plastic materials. The black complex oxide particles are used, in particular, as a black pigment for non-magnetic toner particles as a substitute for carbon black and environmentally load-applying substance-containing oxide pigments and a black pigment for pigmenting engineering plastics requiring kneading operations at a high temperature. Moreover, the toner particles, which comprise such black complex oxide particles incorporated therein, are substantially free of any environmentally load-applying substances such as carbon black, Cu, Cr and Mn and the black complex oxide particles used therein are excellent in the degree of blackness. The use of the complex oxide particles would sufficiently cope with the elimination of, for instance, environmental pollution and any effect on the human body and permit the production of printed matters having high quality.

The present invention will hereunder be described in more detail with reference to the following Examples and Comparative Examples.

EXAMPLE 1

To 5 L of a 4 mole/L aqueous sodium carbonate solution, there was added a 12.5 mole/L aqueous sodium hydroxide solution so that the pH value of the resulting mixed solution was adjusted to 11 and the mixed solution was heated to a temperature of 90° C. and that temperature of the solution was maintained. On the other hand, 2 L of a mixed sulfate solution containing ferrous sulfate, ferric sulfate, magnesium sulfate and aluminum sulfate in concentrations of 0.25 mole/L, 0.5 mole/L, 0.5 mole/L and 0.25 mole/L, respectively was likewise prepared in advance and the mixed solution was poured into and mixed with the foregoing sodium carbonate-containing alkaline aqueous solution with stirring over 30 minutes.

After the completion of the addition of the mixed solution, the stirring and mixing operations were continued over 6 hours. The temperature and pH value of the mixture specified above were held during the pouring, stirring and mixing operations. The slurry containing the black complex oxide particles thus prepared was spontaneously cooled, then neutralized to a pH value of 6 with dilute sulfuric acid, followed by the water-washing, dehydration and drying according to the usual methods to thus gibe final black complex oxide particles.

The resulting black complex oxide particles were subjected to the determination of an X-ray diffraction pattern. The result thus obtained is shown in FIG. 1. Moreover, the resulting black complex oxide particles inspected for a variety of characteristic properties according to the methods specified below. The results thus obtained are summarized in Table 2 given later.

[Evaluation Method]

(1) Amounts of Fe, Mg and Al

A sample was dissolved and the amounts of these elements were determined according to the ICP technique.

(2) Amount of $Fe^{2+}$ (As expressed in Terms of the Amount of FeO)

Each sample was dissolved in a sulfuric acid solution and the resulting solution was subjected to the oxidation-reduction titration using a potassium permanganate reference solution to thus determine the amount of $Fe^{2+}$ ions.

(3) Determination of Average Particle Size

An electron micrograph of each sample was taken using an SEM (scanning electron microscope) of 100,000 magnification and the Feret's diameters of 200 particles to thus determine the average particle size of the resulting particles.

(4) Determination of Specific Surface Area

The specific surface area of each sample was determined using 2200 Type BET Meter available from Shimadzu-Micromeritics Corporation.

(5) Determination of Magnetic Characteristic Properties

The magnetic characteristic properties of each sample were determined at an applied external magnetic field of 79.6 kA/m using Vibrated Sample Type Magnetometer VSM-P7 available from Toei Industries, ltd.

(6) Determination of Degree of Blackness and Hue

The determination of a powdery sample was carried out according to JIS K5101-1991 detailed below:

To 2.0 g of a sample, there was added 1.4 cc of castor oil and the mixture was kneaded in a muller of Hoover's Model. To 2.0 g of this kneaded sample, there was added 7.5 g of lacquer, the mixture was further kneaded, it was applied onto mirror coated paper using a 4 mil applicator, followed by drying the coated paper and then determination of the degree of blackness (L value) and hue values (a and b values) thereof using a color difference meter (Color Analyzer, TC-1800 Model available from Tokyo Denshoku Co., Ltd.).

(7) Test for the Determination of Heat Resistance

Each sample was placed in a watch glass, the watch glass containing the sample was maintained at 150° C. for one hour in an air-through dryer(an oven, PH-201 Model, available from Tabai Espec Co., Ltd.) and then the degree of blackness and hue of the sample were determined by the same method used above in connection with (6) Determination of Degree of Blackness and Hue.

EXAMPLES 2 TO 6 AND COMPARATIVE EXAMPLES 1 to 6

Complex oxide particles were prepared by repeating the same procedures used in Example 1 except that the conditions for the production listed in the following Table 1 were used instead of those used in Example 1. In this connection, the conditions for the production used in Example 1 are likewise listed in Table 1.

The resulting complex oxide particles were likewise inspected for the characteristic properties, which were evaluated according to the same methods used in Example 1. The results thus obtained are summarized in the following Table 2.

TABLE 1

| | Mixed Sulfate Aqueous Solution | | | | | | Alkaline Aqueous Solution | | | |
|---|---|---|---|---|---|---|---|---|---|---|
| | Concn. of Ferrous Sulfate (mol/l) | Concn. of Ferric Sulfate (mol/l) | $Fe^{3+}/Fe^{2+}$ | Concn. of Magnesium Sulfate (mol/l) | Concn. of Aluminum Sulfate (mol/l) | Amount of Solution (L) | Concn. of Sodium Carbonate (mol/l) | Amount of Solution (L) | Reaction pH | Temp. (° C.) |
| Example 1 | 0.25 | 0.50 | 2.00 | 0.50 | 0.25 | 2 | 2.00 | 5 | 11.0 | 90 |
| Example 2 | 0.75 | 0.08 | 0.01 | 0.50 | 0.25 | 2 | 0.15 | 5 | 11.0 | 90 |
| Example 3 | 0.25 | 0.50 | 2.00 | 0.50 | 0.25 | 2 | 4.00 | 5 | 11.0 | 90 |
| Example 4 | 0.38 | 0.38 | 1.00 | 0.07 | 0.20 | 2 | 4.00 | 5 | 11.0 | 90 |
| Example 5 | 0.25 | 0.50 | 2.00 | 0.50 | 0.14 | 2 | 4.00 | 5 | 11.0 | 90 |
| Example 6 | 0.38 | 0.38 | 1.00 | 0.50 | 0.20 | 2 | 6.00 | 5 | 11.0 | 90 |
| Comp.Ex. 1 | 0.38 | 0.38 | 1.00 | — | 0.25 | 2 | 0.15 | 5 | 11.0 | 90 |
| Comp.Ex. 2 | 0.38 | 0.38 | 1.10 | 1.00 | 0.25 | 2 | 0.15 | 5 | 11.0 | 90 |
| Comp.Ex. 3 | 0.38 | 0.38 | 1.00 | 0.10 | — | 2 | 0.15 | 5 | 11.0 | 90 |
| Comp.Ex. 4 | 0.38 | 0.38 | 1.00 | 0.10 | 0.75 | 2 | 0.15 | 5 | 11.0 | 90 |
| Comp.Ex. 5 | 0.25 | 0.75 | 3.00 | 0.50 | 0.25 | 2 | 4.00 | 5 | 11.0 | 90 |
| Comp.Ex. 6 | 0.05 | 0.15 | 3.00 | 0.50 | 0.25 | 2 | 4.00 | 5 | 11.0 | 90 |

TABLE 2

| | Amount of Fe (wt %) | Amount of Mg (wt %) | Amount of Al (wt %) | Molar Ratio: Mg/Fe | Molar Ratio: Al/Fe | Amount of $Fe^{2+}$ (wt %) | Average particle Size (μm) | Total Amt. of Cr, Mn, Co Ni, Cu, Zn (wt %) | Specific Surface Area (m²/g) |
|---|---|---|---|---|---|---|---|---|---|
| Example 1 | 40.1 | 6.31 | 7.09 | 0.36 | 0.37 | 12.5 | 0.055 | 0.42 | 68.5 |
| Example 2 | 49.3 | 2.95 | 3.98 | 0.12 | 0.15 | 18.3 | 0.131 | 0.47 | 28.6 |
| Example 3 | 39.7 | 6.44 | 6.62 | 0.37 | 0.35 | 7.9 | 0.032 | 0.39 | 116.2 |
| Example 4 | 54.3 | 1.07 | 4.31 | 0.05 | 0.18 | 11.7 | 0.041 | 0.55 | 90.4 |
| Example 5 | 49.4 | 5.92 | 3.46 | 0.28 | 0.14 | 13.9 | 0.039 | 0.46 | 95.2 |
| Example 6 | 49.9 | 5.66 | 1.53 | 0.26 | 0.06 | 22.2 | 0.033 | 0.47 | 113.7 |
| Comp.Ex. 1 | 61.4 | — | 5.00 | — | 0.17 | 23.9 | 0.130 | 0.60 | 28.8 |
| Comp.Ex. 2 | 44.8 | 11.12 | 4.13 | 0.57 | 0.19 | 9.0 | 0.063 | 0.51 | 69.5 |
| Comp.Ex. 3 | 48.4 | 1.56 | — | 0.07 | — | 15.6 | 0.132 | 0.44 | 28.4 |
| Comp.Ex. 4 | 36.8 | 2.41 | 13.26 | 0.15 | 0.75 | 7.8 | 0.044 | 0.39 | 85.2 |
| Comp.Ex. 5 | 26.5 | 6.12 | 7.89 | 0.53 | 0.62 | 1.1 | 0.062 | 0.32 | 60.7 |
| Comp.Ex. 6 | 22.3 | 7.21 | 12.40 | 0.74 | 1.15 | 3.2 | 0.027 | 0.36 | 138.2 |

| | Magnetic Properties (Applied magnetic Field: 79.6 kA/m) | | | | | | | | |
|---|---|---|---|---|---|---|---|---|---|
| | Saturation Magnetization (Am²/kg) | Residual Magnetization (Am²/kg) | Coercive Force (A/m) | Degree of Blackness and Hue | | | Heat-Resistance Test Results | | |
| | | | | L | a | b | L | a | b |
| Example 1 | 32.5 | 3.3 | 47 | 18.44 | 0.01 | −0.59 | 18.54 | 0.21 | −0.11 |
| Example 2 | 39.4 | 12.8 | 161 | 18.21 | −0.11 | −0.07 | 18.91 | 0.09 | 0.12 |
| Example 3 | 22.8 | 1.1 | 25 | 21.16 | 0.45 | 0.11 | 21.32 | 0.49 | 0.34 |
| Example 4 | 28.6 | 2.3 | 38 | 20.11 | 0.32 | −0.11 | 20.27 | 0.54 | 0.22 |
| Example 5 | 25.2 | 3.8 | 72 | 1.88 | 0.09 | −0.12 | 22.05 | 0.23 | 0.05 |
| Example 6 | 32.7 | 2.7 | 73 | 18.32 | −0.11 | −0.04 | 23.14 | 0.36 | 0.41 |
| Comp.Ex. 1 | 59.7 | 14.4 | 196 | 17.94 | 0.15 | 0.23 | 21.45 | 1.02 | 1.89 |
| Comp.Ex. 2 | 23.0 | 1.2 | 78 | 23.43 | 0.81 | 0.76 | 24.56 | 1.13 | 1.03 |
| Comp.Ex. 3 | 64.1 | 10.6 | 121 | 19.66 | 0.37 | 0.16 | 22.96 | 0.82 | 1.24 |
| Comp.Ex. 4 | 25.2 | 2.8 | 52 | 24.23 | 0.91 | 1.37 | 25.88 | 1.37 | 1.76 |
| Comp.Ex. 5 | 16.3 | 0.8 | 7 | 23.66 | 0.38 | 0.59 | 23.78 | 0.43 | 0.88 |
| Comp.Ex. 6 | 12.1 | 6.2 | 63 | 23.24 | 0.52 | 0.87 | 23.40 | 0.72 | 1.03 |

As will be seen from the data listed in Table 2, the black complex oxide particles according to the present invention prepared in Examples 1 to 6 have sufficiently low L values, are excellent in the degree of blackness and also excellent in the hue. Excellent results were also observed for the black complex oxide particles of the present invention in the test for the determination of the heat resistance thereof as the accelerated test for determining the deterioration with time and it is also found that these particles have low saturation magnetization and therefore, they can favorably be used in non-magnetic applications.

Contrary to this, the complex oxide particles of Comparative Examples 1 to 6, which are beyond the scope of the present invention, have high saturation magnetization and therefore, they are unfavorable for use in non-magnetic applications. Moreover, they have high L, a and b values, are thus insufficient in the both degree of blackness and hue and unsatisfactory results are observed in the test for the determination of the heat resistance thereof as the accelerated test for determining the deterioration with time.

EXAMPLE 7

There were admixed together, in a Henschel mixer, 15 parts by mass of black complex oxide particles prepared according to the method disclosed in Example 1, 100 parts by mass of a binder resin (TB-1000F available from Sanyo Chemical Industries, Ltd.), 5 parts by mass of a charge-control agent (Bontron S-34 available from Orient Chemical Co., Ltd.) and 2 parts by mass of a wax (Biscol 550P available from Sanyo Chemical Industries, Ltd.) and the resulting mixture was further melted and kneaded at 180° C. in a twin-screw kneader. These mixing and melting-kneading operations were repeated twice. The resulting kneaded product was formed into a plate-like product using cooled rollers to thus give a plate of the kneaded product. The resulting plate was pulverized in a bantam mill, then finely divided in a jet mill and thereafter the resulting fine particles were classified using an air shift spreading machine Turbo Classifier TC-15M available from Nissin Engineering Co., Ltd.) to thus obtain toner particles having an average particle size of 8 µm.

To 4 parts by mass of the resulting toner particles, there was added 96 parts by mass of a carrier (EF96-150 available from Powder Tech. Company), followed by admixing these ingredients to give a developer. The resulting developer was used in a digital/reversal development type copying apparatus (AR-S400 available from Sharp Corporation) to carry out evaluation of the quality of the initially prepared image and the durability observed after printing 50,000 sheets of A4-sized paper. In these tests, the following characteristic properties were evaluated. The results thus obtained are listed in the following Table 3.

(8) Evaluation of the Image Density

A black solid image having a size of 1-inch square was printed on the center of a sheet of A4-sized paper and the density of the image was determined using Macbeth reflection-densitometer (available from Gretag Macbeth).

(9) Evaluation of Fogging

The white ground of the printed matter used in the foregoing item (8) was inspected for the L value using a color difference meter (Z-300A available from Nippon Denshoku Kogyo K.K.) and the results were numerically expressed according to the following equation:

(L value observed after the printing)−(L value observed before the printing).

(10) Determination of the Quantity of Toner Charges

Immediately after the completion of the painting or printing of an image for the evaluation of the initially prepared image, 0.2 g of the developer was sampled from the copying machine for evaluation and the quantity of charges on the toner particles was determined using a charge quantity-measuring device (TB-200 Model available from Toshiba Chemical Co., Ltd.) according to the blow-off method. Moreover, after the formation of 50,000 printed matters of A4-size, an image was printed or painted for the evaluation and immediately thereafter, 0.2 g of the developer was sampled from the copying machine for evaluation and the quantity of charges on the toner particles was determined by the same method used above. In this connection, the quantity of charges can be calculated according to the following equation:

Quantity of Charges (µ/g)=(The indication of the measuring device)/(Toner concentration)/0.2

In this respect, the term "toner concentration" herein used means the value calculated from the amount of the developer after the evaluation of the image and the amount of the toner calculated by absorbing only the toner from the developer, in accordance with the following equation:

[Amount of the Toner (g)]/[Amount of the Developer (g)].

EXAMPLES 8 TO 10

Developers were prepared by repeating the same procedures used in Example 7 except for using black complex oxide particles prepared according to the production method disclosed in Example 1, which had been surface-treated with n-hexyl trimethoxy silane (TSL8241 available from Toshiba GE Silicone Company) (Example 8), hexamethyl disilazane (TSL8802 available from Toshiba GE Silicone Company) (Example 9) or γ-aminopropyl trimethoxy silane (TSF484 available from Toshiba GE Silicone Company) (Example 10) in amounts of 1% by mass, respectively on the basis of the amount of the complex oxide particles in place of the black complex oxide particles used in Example 7 and the products of Examples 8 and 9 were evaluated according to the same methods used in Example 7. On the other hand, the product of Example 10 was evaluated using SF-2035 available from Sharp Corporation as a copying apparatus. The results thus obtained are listed in the following Table 3.

TABLE 3

| | Image Density | | Evaluation of Fogging | | Quanity of Charges of Toner Particles | |
|---|---|---|---|---|---|---|
| | Initial | After Printing 50,000 Printed Matters | Initial | After Printing 50,000 Printed Matters | Initial | After Printing 50,000 Printed Matters |
| Example 7 | 1.44 | 1.43 | 0.25 | 0.19 | 25.3 | 30.1 |
| Example 8 | 1.46 | 1.44 | 0.32 | 0.23 | 22.1 | 26.8 |
| Example 9 | 1.42 | 1.41 | 0.21 | 0.15 | 28.3 | 30.1 |
| Example 10 | 1.4 | 1.43 | 0.34 | 0.27 | 16.4 | 18.2 |

In this field, an excellent developer should have an image density of not less than 1.4 and an evaluated-fogging value of not more than 0.4. The data listed in Table 3 clearly indicate that the toner particles of the present invention are quite excellent as developers. Moreover, when the toner of the present invention was used, any scattering of the toner particles was not observed at all and there was not observed any image defect such as white spot and brush-scratching mark.

The invention claimed is:

1. Black complex oxide particles comprising Fe, Mg and Al as metal components, wherein the amount of Fe ranges from 30 to 55% by mass, the ratio of $Fe^{3+}$ atoms to $Fe^{2+}$ atoms ($Fe^{3+}/Fe^{2+}$) ranges from 0.8 to 10, the amount of Mg ranges from 1 to 10% by mass and the amount of Al ranges from 1 to 10% by mass.

2. The black complex oxide particles as set forth claim 1, wherein the amount of $Fe^{2+}$ ranges from 8 to 20% by mass as expressed in terms of the amount of FeO.

3. The black complex oxide particles as set forth in claim 1, wherein the complex oxide is a water-containing complex oxide.

4. The black complex oxide particles as set forth in claim 1, wherein they comprise a complex oxide represented by the following chemical compositional formula:

$$Fe^{2+}_a Fe^{3+}_b Mg_c Al_d O_e \cdot nH_2O$$

wherein
a+b+c+d=1;
$0.08 \leq a \leq 0.59$;
$0.13 \leq b \leq 0.80$;
$0.02 \leq c \leq 0.42$;
$0.02 \leq d \leq 0.40$;
e=a+1.5b+c+1.5d; and
$0 \leq n \leq 5.1$.

5. The black complex oxide particles as set forth in claim 4, wherein the complex oxide satisfies the following requirement:

$$0.05 \leq c/(a+b) \leq 0.5.$$

6. The black complex oxide particles as set forth in claim 4, wherein the complex oxide satisfies the following requirement:

$$0.15 \leq d/(a+b) \leq 0.6.$$

7. The black complex oxide particles as set forth in claim 1, wherein the total amount of metal components other than Fe, Mg and Al is not more than 1% by mass.

8. The black complex oxide particles as set forth in claim 1, wherein the average particle size of the black complex oxide particles ranges from 0.01 to 1 μm.

9. The black complex oxide particles as set forth in claim 1, wherein with respect to the degree of blackness and the hue of powder as determined according to JIS K 5101-1991, the black complex oxide particles has an L value of not more than 22, an a value of not more than 0.5 and a b value of not more than 0.5, as determined using a color-difference meter.

10. The black complex oxide particles as set forth in claim 1, wherein the black complex oxide particles have a saturation magnetization value as determined at an applied magnetic field of 79.6 kA/m of not more than 50 Am²/kg.

11. The black complex oxide particles as set forth in claim 1, wherein the black complex oxide particles have a volume resistivity of not less than $1 \times 10^6$ Ω cm.

12. The black complex oxide particles as set forth in claim 1, wherein the black complex oxide particles are surface-treated with at least one compound selected from the group consisting of silane coupling agents, silylation agents and reactive silicone oils in an amount ranging from 0.5 to 5% by mass on the basis of the mass of the particles.

13. A method for the preparation of black complex oxide particles comprising Fe, Mg and Al as metal components, wherein the amount of Fe ranges from 30 to 55% by mass, the ratio of $Fe^{3+}$ atoms to $Fe^{2+}$ atoms ($Fe^{3+}/Fe^{2+}$) ranges from 0.8 to 10, the amount of Mg ranges from 1 to 10% by mass and the amount of Al ranges from 1 to 10% by mass, comprising the steps of gradually adding a mixed aqueous solution containing a ferric salt, a ferrous salt, a water-soluble magnesium salt and a water-soluble aluminum salt to an alkaline aqueous solution containing sodium carbonate, while maintaining the temperature of the alkaline aqueous solution to not less than 80° C. and the pH value thereof to not less than 10 and mixing these solutions with stirring over not less than one hour.

14. The preparation method as set forth in claim 13, wherein the method uses the mixed aqueous solution containing a ferric salt, a ferrous salt, a water-soluble magnesium salt and a water-soluble aluminum salt, whose molar ratio: $Fe^{3+}/Fe^{2+}$ ranges from 0.01 to 4.

15. The preparation method as set forth in claim 13, wherein after the completion of the mixing step with stirring over one hour, the resulting slurry is heat-treated under pressure at a temperature of not less than 100° C.

16. The black complex oxide particles as set forth in claim 2, wherein the complex oxide is a water-containing complex oxide.

17. The black complex oxide particles as set forth in claim 2, wherein they comprise a complex oxide represented by the following chemical compositional formula:

$$Fe^{2+}_a Fe^{3+}_b Mg_c Al_d O_e \cdot nH_2O$$

wherein
a+b+c+d=1;
$0.08 \leq a \leq 0.59$;
$0.13 \leq b \leq 0.80$;
$0.02 \leq c \leq 0.42$;
$0.02 \leq d \leq 0.40$;
e=a+1.5b+c+1.5d; and
$0 \leq n \leq 5.1$.

18. The black complex oxide particles as set forth in claim 3, wherein they comprise a complex oxide represented by the following chemical compositional formula:

$$Fe^{2+}_a Fe^{3+}_b Mg_c Al_d O_e \cdot nH_2O$$

wherein
a+b+c+d=1;
$0.08 \leq a \leq 0.59$;
$0.13 \leq b \leq 0.80$;
$0.02 \leq c \leq 0.42$;
$0.02 \leq d \leq 0.40$;
e=a+1.5b+c+1.5d; and
$0 \leq n \leq 5.1$.

19. The black complex oxide particles as set forth in claim 5, wherein the complex oxide satisfies the following requirement:

$$0.15 \leq d/(a+b) \leq 0.6.$$

20. The preparation method as set forth in claim 14, wherein after the completion of the mixing step with stirring over one hour, the resulting slurry is heat-treated under pressure at a temperature of not less than 100° C.

* * * * *